US008836890B2

(12) United States Patent
Lee et al.

(10) Patent No.: US 8,836,890 B2
(45) Date of Patent: Sep. 16, 2014

(54) LIQUID CRYSTAL DISPLAY

(75) Inventors: Sangwook Lee, Seoul (KR); Doowon Lee, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 327 days.

(21) Appl. No.: 12/900,932

(22) Filed: Oct. 8, 2010

(65) Prior Publication Data
US 2011/0205466 A1  Aug. 25, 2011

(30) Foreign Application Priority Data

Feb. 22, 2010 (KR) .................. 10-2010-0015840

(51) Int. Cl.
*G02F 1/1335* (2006.01)
(52) U.S. Cl.
USPC .............................................. 349/62; 349/63
(58) Field of Classification Search
CPC .. G02B 6/0038; G02B 6/0055; G02B 6/0061; G02F 1/133606; G02F 2001/133616
USPC ................................................... 349/58–67
See application file for complete search history.

(56) References Cited

U.S. PATENT DOCUMENTS

| 6,700,632 B2 | 3/2004 | Taniguchi et al. | |
| 6,885,419 B2 * | 4/2005 | Ogawa | 349/58 |
| 8,346,048 B2 * | 1/2013 | Bita et al. | 385/146 |
| 2001/0055076 A1 * | 12/2001 | Ochi et al. | 349/63 |
| 2005/0036083 A1 * | 2/2005 | Hayashi et al. | 349/63 |
| 2009/0091685 A1 * | 4/2009 | Nishino et al. | 349/63 |

FOREIGN PATENT DOCUMENTS

| JP | 07-333610 | 12/1995 |
| JP | 2000-075293 | 3/2000 |
| KR | 1020090064264 | 6/2009 |

* cited by examiner

*Primary Examiner* — Dung Nguyen
(74) *Attorney, Agent, or Firm* — F. Chau & Associates, LLC

(57) ABSTRACT

Disclosed is a display apparatus capable of preventing external light from being excessively reflected and increasing the reflection efficiency of internal light, thereby improving visibility of the display apparatus. The display apparatus includes a display panel, which displays an image, and a front-light unit including an internal light source, a light guide plate to guide the internal light emitted from the internal light source to the display panel, and an optical member provided at an upper portion of the light guide plate. The display apparatus also includes a display panel, an internal light source emitting internal light, an optical member preventing external light from being reflected, and a substrate with the optical member.

20 Claims, 11 Drawing Sheets

LIQUID CRYSTAL DISPLAY

CROSS-REFERENCE TO RELATED APPLICATION

This application claims priority to Korean Patent Application No. 2010-15840 filed on Feb. 22, 2010, the contents of which are herein incorporated by reference in their entirety.

BACKGROUND

1. Technical Field

The present invention relates to a display apparatus capable of increasing light efficiency. More particularly, the present invention relates to a display apparatus including a display panel and a front light unit.

2. Discussion of the Related Art

Recently, as monitors, lap-top computers, TVs, and mobile communication terminals have a tendency toward lightness and slimness, a display apparatus is also required to have the lightness and slimness. In order to satisfy this requirement, various flat panel displays have been rapidly developed and extensively used instead of a conventional cathode ray tube.

A liquid crystal display (LCD) is one of the flat panel displays. The LCD includes a liquid crystal layer having dielectric anisotropy between two substrates. In the LCD, an electric field is applied to the liquid crystal layer, and the intensity of the electric field is adjusted, thereby controlling an amount of light passing through the substrates such that a desired image can be represented.

However, since the liquid crystal is not a light-emissive material and the LCD displays an image by adjusting an amount of light incident into the liquid crystal, the light needs to be radiated to the liquid crystal through a predetermined scheme.

The LCD may be classified into a transmissive LCD and a reflective LCD.

The transmissive LCD includes a backlight unit at the rear surface of a liquid crystal display panel. The transmissive LCD transmits light from the backlight unit to the liquid crystal display panel to allow an image to be displayed. The backlight unit includes a surface light source, such as a fluorescent lamp or an electro-luminescence (EL) lamp.

However, since the transmissive LCD includes the backlight unit for light emission, the transmissive LCD requires increased power consumption, and the image is not clearly viewed in a bright place such as an outdoor place exposed to direct sunlight.

The reflective LCD displays an image by using ambient light. Accordingly, the reflective LCD does not require the backlight unit, so that power consumption is low. In addition, unlike the transmissive LCD displaying an image that is not clearly viewed in a bright place, the reflective LCD can display an image that is clearly viewed in the bright place. Therefore, the reflective LCD has been applied to mobile communication terminals that are increasingly demanded in the market.

However, since the reflective LCD uses ambient light as described above, the display brightness is significantly dependent on external environments, so that an image may not be recognized in a dark place or at nighttime when there is less light. A lack of ambient light is more noticeable with a reflective LCD employing color filters or a polarizing plate, so that an auxiliary illumination device is necessary to compensate for the shortage of the ambient light.

A front-light device has been suggested as the auxiliary illumination device to supply light to the reflective LCD in a dark place. A front-light LCD with the front-light device operates similarly to the reflective LCD in a place having a sufficient amount of light, and is supplied with light from the front-light device in a place having an insufficient amount of a light. That is, the front-light LCD adopts advantages of the transmissive and reflective LCDs while removing disadvantages of the transmissive and reflective LCDs, so the front-light LCD may be expected to be extensively used.

In general, the front-light device includes a light guide plate provided at the front of a liquid crystal display panel and a light source provided at a lateral side of the light guide plate. After light output from the light source is incident into the lateral side of the light guide plate, the light travels inside the light guide plate, and then is reflected by a pattern formed on the surface of the light guide plate. The reflected light is radiated onto the liquid crystal display panel. In this case, the light is adjusted according to display information while passing through the liquid crystal display panel. Thereafter, the light is reflected by a reflective plate provided at the rear of the liquid crystal display panel, and then transmitted into the light guide plate again, so that the light is output toward a user. Accordingly, the user can recognize screen information displayed on the liquid crystal display panel even if the ambient light is insufficient.

The front-light device has been be used in a display for outdoor advertisement. In this case, strong light is incident into a display apparatus from an external light source, such as sunlight, so that visibility may be reduced.

SUMMARY

Embodiments of the present invention provide a display apparatus capable of preventing external light from being excessively reflected and increasing reflection efficiency of internal light, thereby improving visibility.

According to an embodiment, a display apparatus includes a display panel and a front-light unit. The display panel displays an image. The front-light unit includes an internal light source to emit internal light, a light guide plate to guide the internal light emitted from the internal light source to the display panel, and an optical member provided at an upper portion of the light guide plate to prevent external light from being reflected.

The optical member may include an external light anti-reflection member and an internal light reflection member. The external light anti-reflection member prevents the external light from being incident into the display panel. The internal light reflection member reflects the internal light toward the display panel. The internal light is emitted from the internal light source and exits in an opposite direction from the display panel.

The display apparatus may further include a protective substrate provided at an upper portion of the front-light unit.

The display apparatus may further include a lower container to receive the protective substrate, the front-light unit, and the display panel.

The display apparatus may further include an upper container coupled with the lower container to hold the protective substrate, the front-light unit, and the display panel.

The internal light source may include at least one of a cold cathode fluorescent lamp, a hot cathode fluorescent lamp, an external electrode fluorescent lamp, and a light emitting diode.

The display panel may be a liquid crystal display panel.

The internal light reflection member may include a first member and a second member. The first member contacts the external light anti-reflection member. The second member is provided on the first member to reflect the internal light toward the display panel.

The second member may have at least one of a prism shape, a pyramid shape, and a concave-convex shape.

According to an embodiment, a display apparatus includes a display panel, an internal light source, an optical member, and a substrate. The display panel displays an image. The internal light source emits internal light. The optical member prevents external light from being reflected. The substrate has the optical member.

The optical member may include an external light anti-reflection member, which prevents the external light from being incident into the display panel, and an internal light reflection member, which reflects the internal light emitted from the internal light source and exiting in a direction opposite to the display panel back to the display panel.

The substrate including the optical member thereon may include a protective substrate.

The display apparatus may further include a lower container to receive the protective substrate, the internal light source, and the display panel.

The display apparatus may further include an upper container coupled with the lower container to hold the protective substrate, the internal light source, and the display panel.

The internal light source may include at least one of a cold cathode fluorescent lamp, a hot cathode fluorescent lamp, an external electrode fluorescent lamp, and a light emitting diode.

The display panel may be a liquid crystal display panel.

The display apparatus may further include a light guide plate to guide the internal light emitted from the internal light source to the display panel.

The internal light reflection member may include a first member contacting the external light anti-reflection member and a second member provided on the first member to reflect the internal light to the display panel.

The second member may have at least one of a prism shape, a pyramid shape, and a concave-convex shape.

As described above, according to embodiments of the present invention, external light is prevented from being excessively incident, and the light efficiency of internal light can be increased, thereby improving visibility.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, exemplary embodiments of the present invention will be described in more detail with reference to the accompanying drawings. However, the present invention is not limited to the following embodiments but includes various applications and modifications.

Figure 1A:
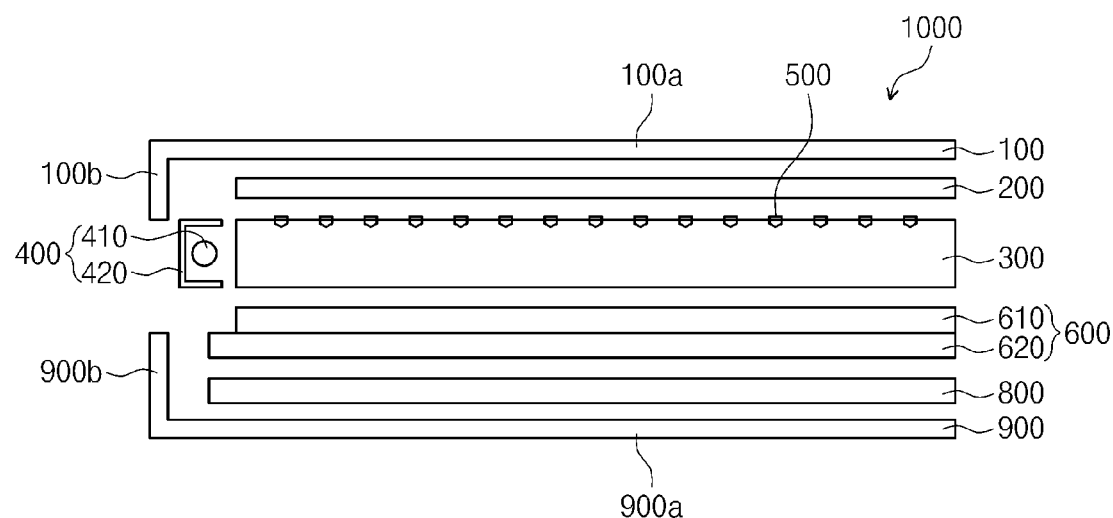
FIG. 1A is a sectional view showing a liquid crystal display according to an embodiment of the present invention.

FIG. 1A is a sectional view showing a liquid crystal display (LCD) 1000 according to an embodiment of the present invention.

Figure 1B:
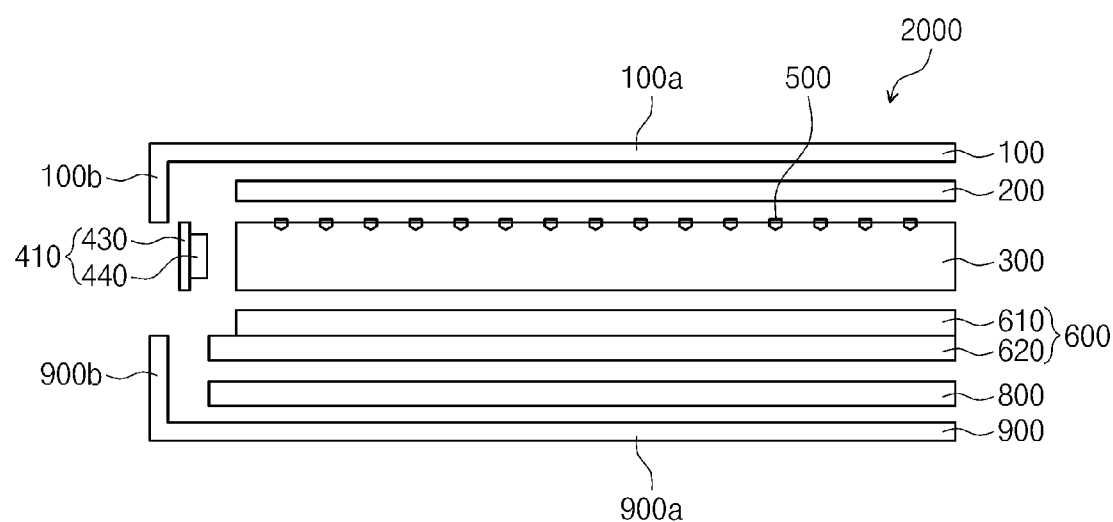
FIG. 1B is a sectional view showing a liquid crystal display including a modified light source according to an embodiment of the present invention.
Figure 2:
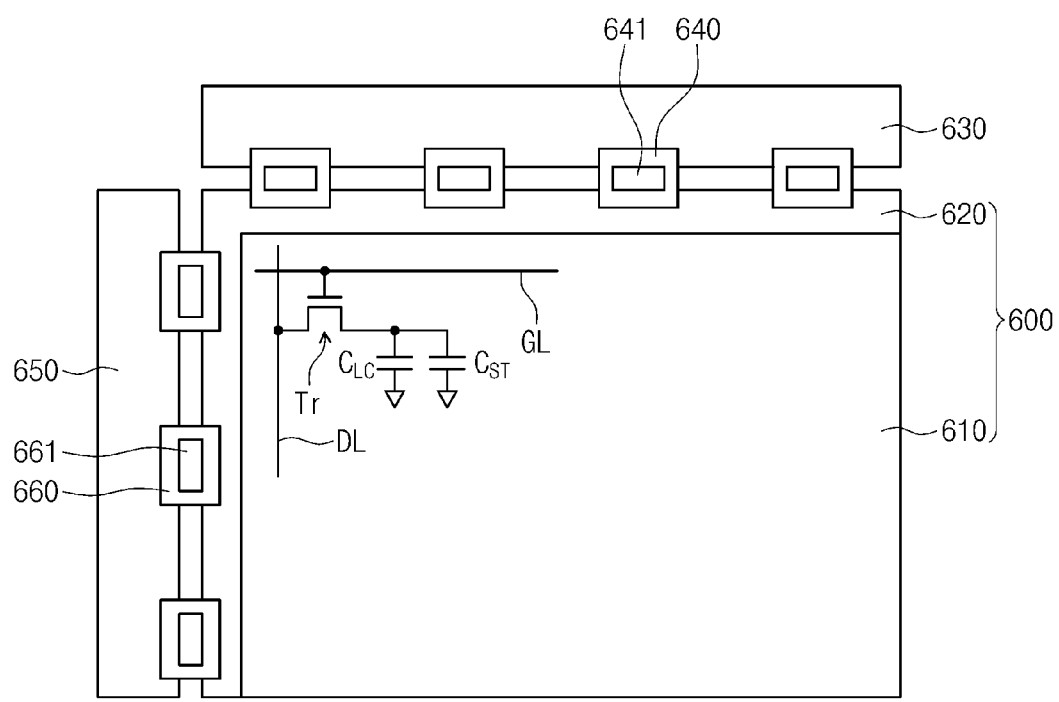
FIG. 2 is a plan view showing a display panel of FIG. 1A or 1B.

FIG. 1B is a sectional view showing an LCD 2000 including a modified light source according to an embodiment of the present invention. FIG. 2 is a plan view showing a liquid crystal display panel 600 of FIG. 1A or 1B. Referring to FIGS. 1A and 1B, the LCD 1000 includes a front-light unit at an upper portion and the liquid crystal display panel 600 at a lower portion The front-light unit includes a light source unit 400 to emit internal light, a light guide plate 300 to guide the internal light emitted from an internal light source 410 to the liquid crystal display panel 600, and an optical member 500 positioned at an upper portion of the light guide plate 300 to prevent external light from being reflected.

The light source unit 400 includes the internal light source 410 and a light source cover 420 surrounding the internal light source 410 such that the internal light is emitted in a predetermined direction.

Referring to FIGS. 1A, 1B, and 2, the liquid crystal display panel 600 includes a color filter substrate 610 and a thin film transistor (TFT) substrate 620. The color filter substrate 610 has a plurality of pixels including RGB color pixels, which represent colors when light passes through the RGB color pixels formed through a thin film process. Since the pixels have the same structure and functions, FIG. 2 shows one exemplary pixel for the purpose of brevity.

The color filter substrate 610 includes on a bottom surface a common electrode (not shown) including a transparent conductor, such as indium tin oxide (ITO) or indium zinc oxide (IZO).

The TFT substrate 620 is a transparent substrate on which a plurality of TFTs Tr are provided in the form of a matrix. Each TFT Tr includes source, gate, and drain terminals. The source terminal of the TFT Tr is connected to a data line DL, and the gate terminal of the TFT Tr is connected to a gate line GL. In addition, the drain terminal is connected to a pixel electrode (not shown) comprising a transparent electrode including a transparent conductive material. When electrical signals are input to the data and gate lines DL and GL, the TFTs Tr are turned on or off, so that a necessary electrical signal is applied to the pixel electrode connected to the drain terminal. When power is applied to the gate and source terminals of the TFT Tr so that the TFT Tr is turned on, an electric field is formed between the pixel electrode (not shown) and the common electrode (not shown) of the color filter substrate 610. Accordingly, the alignment of liquid crystal molecules in the liquid crystal layer interposed between the TFT substrate 610 and the color filter substrate 620 is changed, so that light transmittance is changed. Therefore, a desired image can be obtained.

Referring to FIG. 2, a driving circuit is connected to the liquid crystal display panel 600. The driving circuit includes a data-side printed circuit board (PCB) 630, which has a control integrated circuit (IC) (not shown) to apply a predetermined data signal to the data line DL of the TFT substrate 620, a gate-side PCB 650, which has a control IC to apply a predetermined gate signal to the gate line GL of the TFT substrate 620, a data-side flexible PCB 640, which is used to connect the data-side PCB 630 to the TFT substrate 600 through an exposed grounding pattern (not shown), and a gate-side flexible PCB 660, which is used to connect the gate-side PCB 650 to the TFT substrate 600 through an exposed grounding pattern (not shown).

The data-side and gate-side PCBs 630 and 650 are connected to the data-side and gate-side flexible PCBs 640 and 660, respectively, for the conversion and application of an external image signal and a gate driving signal. The data-side and gate-side PCBs 630 and 650 may be integrated into one PCB and connected to one side of the liquid crystal display panel 600. To this end, the data line DL and the gate line GL of the TFT substrate 620 may be exposed to one side of the liquid crystal display panel 600 (not shown).

The data-side and gate-side PCBs 640 and 660 are connected to the data line DL and the gate line GL of the TFT substrate 620, respectively, to apply data and gate driving signals to the TFT Tr. In addition, a TAB IC 641 is mounted on the data-side PCB 640 to transmit an image signal, such as an RGB signal, a shift start clock signal, a latch pulse signal, a gamma analog grounding signal, a digital grounding signal, digital power, an analog power common voltage, and an accumulation voltage, which are generated from the data-side PCB 640, to the liquid crystal display panel 600. The TFT substrate 620 may have an IC thereon.

The data-side and gate-side PCBs 630 and 650 may be integrated into one PCB. The number of the data-side and gate-side flexible PCBs 640 and 660 may be reduced. To this end, wiring may be directly formed on the TFT substrate 620 or a driving chip may be mounted on the TFT substrate 620.

The LCD 1000 may additionally include an upper receiving member 100 and a lower receiving member 900.

The upper receiving member 100 is bent at a right angle in the form of a rectangular frame and includes a plane surface 100a and a lateral surface 100b to protect the liquid crystal display panel 600 or the front-light unit from an external shock while preventing the liquid crystal display panel 600 and the front-light unit from being separated from the LCD 1000. The upper receiving member 100 may cover the entire portion or a portion of the front-light unit and the liquid crystal display panel 600.

The lower receiving member 900 is provided in the form of a rectangular parallelepiped box having an open top surface and a receiving space having a predetermined depth. The lower receiving member 900 includes a bottom surface 900a and a lateral surface 900b protruding from each edge of the bottom surface 900a perpendicularly to the bottom surface 900a. The internal light source 410 is provided at an inside of the LCD 1000 between the two lateral surfaces 100b and 900b facing each other.

Referring to FIGS. 1A and 1B, the internal light source 410 may include a fluorescent lamp. The fluorescent lamp may include a cold cathode fluorescent lamp (CCFL), an external electrode fluorescent lamp (EEFL), or a hot cathode fluorescent lamp (HCFL). The fluorescent lamp receives a lamp driving voltage from an external source (not shown) to emit light.

Although not shown, the fluorescent lamp includes a lamp tube filled with a discharge gas and electrodes protruding from both distal ends of the lamp tube to receive an external voltage. A plurality of the fluorescent lamps may be arranged in parallel to a longer side of the lower receiving member 900, thereby uniformly distributing the discharge gas in the fluorescent lamp so that uniform brightness can be obtained.

As shown in FIG. 1B, the internal light source 410 may include a light emitting diode LED.

In this case, the internal light source 410 includes a light emitting diode 440 and a PCB 430 on which the light emitting diode 440 is mounted. The light emitting diode 440 may include a plurality of light emitting diodes emitting white light or a light emitting diode package including red (R), green (G), and blue (B) light emitting diodes. The PCB 430 not only discharges heat emitted from the light emitting diode 440 to the outside, but also applies a predetermined voltage to the light emitting diode 440. The PCB 430 has a groove such that the light emitting diode 440 is mounted in the groove. Also, the PCB 430 has reflective surfaces surrounding the light emitting diode 440, thereby maximizing light efficiency. At least one light emitting diode 440 may be mounted on the PCB 430.

The LCD 1000 may additionally include a protective substrate 200 and a reflective sheet 800.

The protective substrate 200 is provided above the light guide plate 300 to protect the internal light source 410 and the light guide plate 300. The protective substrate 200 may include glass or plastic. The protective substrate 200 may include a thin film, such as a sheet.

The reflective sheet 800 includes a plate having high reflectance to reflect light, which is incident into the reflective sheet 800 through the rear surface of the liquid crystal display panel 600, toward the liquid crystal display panel 600, thereby reducing light loss. The reflective sheet 800 contacts a bottom surface of the lower receiving member 900. The reflective sheet 800 may have a flat shape. In addition, the reflective sheet 800 may have a corrugate shape including a reference reflective surface and triangle mountains protruding from the reference reflective surface. In addition, when the bottom surface of the lower receiving member 900 includes a material having superior reflection efficiency, an additional reflective sheet 800 may be omitted. The lower receiving member 900 may be integrated with the reflective sheet 800.

Referring to FIGS. 1A and 1B, the internal light source 410 may be provided at one lateral surface or two facing lateral surfaces among four surfaces of the light guide plate 300 except for two surfaces facing the protective surface 200 and the reflective sheet 800, respectively. The internal light source 410 may be provided at all of the four surfaces of the light guide plate 300. The number of such light source units may vary depending on the size of an LCD and the type of products (e.g., an LCD for a portable phone, a monitor, a lap-top computer, or a TV).

The light guide plate 300 guides internal light emitted from the internal light source 410 to the liquid crystal display panel 600. The light guide plate 300 includes a wedge-type plate or a parallel plate. For example, the light guide plate 300 includes polymethylmethacrylate (PMMA) having superior light transmittance and high strength such that the light guide plate 300 is not easily deformed or broken. As shown in FIGS. 1A, 1B, and 2, the light guide plate 300 may be spaced apart from the internal light source 410 at a predetermined distance or contact the internal light source 410. A portion of the internal light source 410 may overlap the light guide plate 300.

The optical member 500 is provided on a top surface of the light guide plate 300 to block light from an external light source (e.g., sunlight), so that visibility is prevented from being degraded. When the external light is excessively incident, the external light is excessively reflected so that a user is dazzled by the excessive reflection of the external light. Accordingly, the user may not recognize a displayed image. Therefore, the optical member 500 prevents excessive reflection.

Grooves may be formed on the top surface of the light guide plate 300 at a position corresponding to the position of the optical member 500. In this case, a portion or an entire portion of the optical member 500 may be provided in the grooves.

Although not shown, the LCD according to an embodiment of the present invention may include a plurality of optical sheets (not shown). The optical sheets include a diffusion sheet, a polarization sheet, and a brightness enhancement sheet to increase light efficiency and provide a uniform light brightness distribution. The diffusion sheet allows light, which is incident from the liquid crystal display panel 600, to be directed to a front surface of the light guide plate 300, and diffuses the light such that the light has a uniform distribution in a wide range. The diffusion sheet may include a transparent resin film coated with a predetermined light diffusion member at both sides of the film. The brightness enhancement sheet vertically deflects obliquely incoming light beams among light beams incident into the brightness enhancement sheet such that the inclined light is output perpendicular to the LCD panel 600. This is required because light efficiency is increased when light incident into the liquid crystal display panel 600 is perpendicular to the liquid crystal display panel 600. Accordingly, at least one brightness enhancement sheet may be provided below the liquid crystal display panel 600 to change light output from the brightness enhancement sheet into vertical light. In the case that two brightness enhancement sheets are used, a first brightness enhancement sheet is used to polarize light from the diffusion sheet in one direction, and a second brightness enhancement sheet is used to polarize light in a direction perpendicular to a first polarizing sheet. A reflective polarization film transmits light parallel to a transmission axis and reflects light perpendicular to the transmission axis. For example, the transmission axis of the reflective polarization film has the same direction as that of a polarization axis of the brightness enhancement sheet to increase light transmission efficiency.

FIGS. 3A to 3F are enlarged sectional views showing the optical member 500 of FIG. 1A or FIG. 1B according to an embodiment of the present invention.

Referring to FIGS. 3A to 3F, the optical member 500 includes an external light anti-reflection member 510 to prevent external light from being incident into the display panel 600. As shown in FIGS. 3A to 3F, the cross-section of the external light anti-reflection member 510 has a rectangular shape, but the present invention is not limited thereto.

In addition, the optical member 500 includes internal light reflection members 520a to 520f to reflect internal light, which is emitted from the internal light source 410 and exits in an opposite direction from the liquid crystal display panel 600, toward the liquid crystal display panel 600.

The internal light reflection members 520a to 520f may have various shapes to increase reflection efficiency. For example, the internal light reflection members 520a to 520f may have at least one of a prism shape, a pyramid shape, and a concave-convex shape.

Figure 3A:
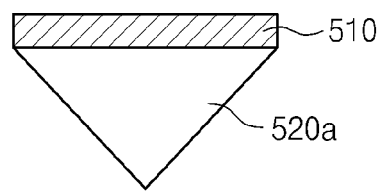
FIGS. 3A to 3F are views showing an optical member of FIG. 1A or 1B according to an embodiment of the present invention.
Figure 3B:
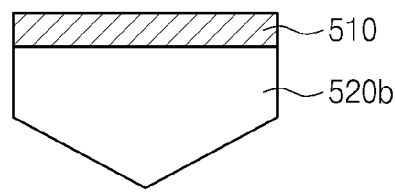
Figure 3C:
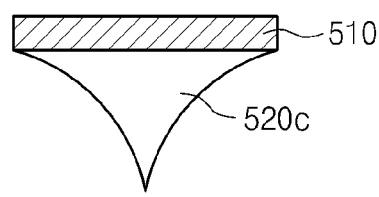
Figure 3D:
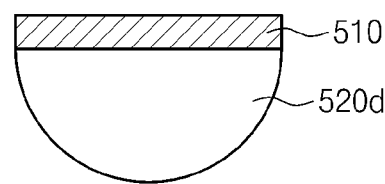
Figure 3E:
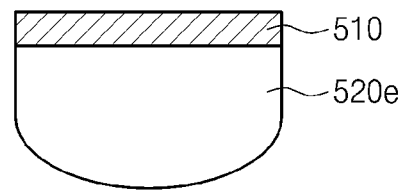
Figure 3F:
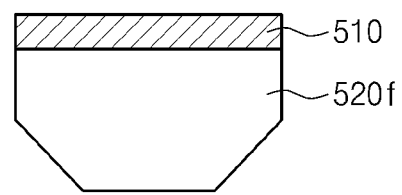

The internal light reflection member 520a has a triangular cross-section in FIG. 3A, and the internal light reflection member 520b has a pentagonal cross-section in FIG. 3B. In FIG. 3C, the cross-section of the internal light reflection member 520c has the shape of a triangle with two concaved sides. In FIG. 3D, the cross-section of the internal light reflection member 520d has a semi-circular shape. In FIG. 3E, the cross-section of the internal light reflection member 520e has the shape of a rectangle having one oval surface. In FIG. 3F, the cross-section of the internal light reflection member 520f has a hexagonal shape. In FIGS. 3A to 3F, the cross-sectional shapes of the internal light reflection members 520a to 520f are provided as illustrative purposes, but the present invention is not limited thereto. The external light anti-reflection member 510 includes a black matrix material used in the liquid crystal display panel 600. Although the external light anti-reflection member 510 includes an inorganic material, such as a chromium oxide (CrOx) or chromium (Cr), the external light anti-reflection member 510 may include an organic material, such as a photoresist agent containing black pigment. In this case, a portion of external light incident into the light guide plate 300 can be blocked, so that the effect of the present invention can be accomplished. In addition, various materials may be used to increase the adhesion of the light guide plate 300 or the protective substrate 200.

The external light anti-reflection member 510 can improve visibility by preventing the excessive reflection of external light.

The internal light reflection members 520a to 520f prevent internal light emitted from the internal light source 410 from being output to an outside of the liquid crystal display panel 600 to effectively guide the internal light toward the liquid crystal display panel 600, thereby increasing light efficiency. Accordingly, the function of the front-light unit can be ensured in a reflective display apparatus. In FIGS. 3A to 3F, the internal light reflection members 520a to 520f include a material. For example, metal, such as aluminum (Al), having superior reflection efficiency may be used. However, another material having superior reflectance can also be used by taking into consideration the desired reflectance and the interaction with respect to other materials.

FIGS. 4A to 4F are enlarged sectional views showing the optical member 500 of FIG. 1A or 1B according to an embodiment of the present invention. The same reference numerals will be assigned to the same or substantially the same elements as those described in connection with FIGS. 1A, 1B, ort.

Different from FIGS. 3A to 3F, the optical member 500 of FIGS. 4A to 4F further includes support members 530a to 530f between the external light anti-reflection member 510 and internal light reflection members 521a to 521f. In this case, the support members 530a to 530f are formed in the shape of the internal light reflection members 521a to 521f, respectively. A material having high reflection efficiency is coated on the support members 530a to 530f to form the internal light reflection members 521a to 521f, respectively. That is, the internal light reflection members 521a to 521f are coated to have a shape corresponding to a shape of the support members 530a to 530f, respectively. The internal light reflection members 521a to 521f may have various shapes to increase reflection efficiency. For example, the internal light reflection members 521a to 521f may have at least one of a prism shape, a pyramid shape, and a concave-convex shape.

Figure 4A:
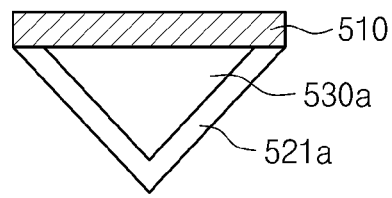
FIGS. 4A to 4F are views showing an optical member of FIG. 1A or 1B according to an embodiment of the present invention.
Figure 4B:
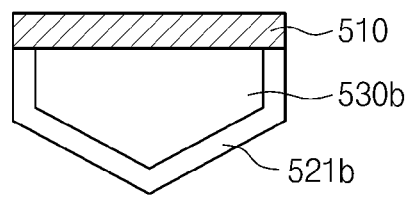
Figure 4C:
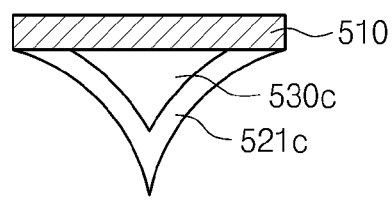
Figure 4D:
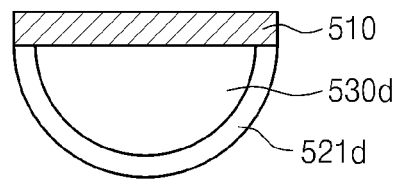
Figure 4E:
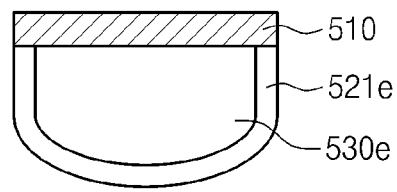
Figure 4F:
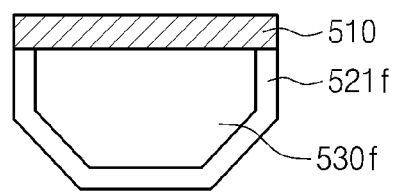

In FIG. 4A the support member 530a has a triangular cross-section, and in FIG. 4B, the support member 530b has a pentagonal cross-section. In FIG. 4C, the cross-section of the support member 530c has the shape of a triangle with two concaved sides. In FIG. 4D, the cross-section of the support member 530d has a semi-circular shape. In FIG. 4E, the cross-section of the support member 530e has the shape of a rectangle having one oval surface. In FIG. 4F, the cross-section of the support member 530f has a hexagonal shape.

The cross-section of the internal light reflection member 521a has a "V" shape in FIG. 4a, and the cross-section of the internal light reflection member 521b has a substantially "V" shape having upper portions vertically contacting the external light anti-reflection member 510 as shown in FIG. 4B. The cross-section of the internal light reflection member 521c has a substantially V shape having upper portions curved outward as shown in FIG. 4C, and the cross-section of the internal light reflection member 521d has a substantially U shape as shown in FIG. 4D. The cross-section of the internal light reflection member 521e has a substantially U shape having upper portions vertically contacting the external light anti-reflection member 510 as shown in FIG. 4E. The cross-section of the internal light reflection member 521f has an angled U shape as shown in FIG. 4F.

In FIGS. 4A to 4F, the cross-sectional shapes of the support members 530a to 530f and the internal light reflection members 521a to 521b are provided for illustrative purposes, but the present invention is not limited thereto.

FIGS. 5A to 5F are enlarged sectional views showing the optical member 500 of FIG. 1A or 1B according to an embodiment of the present invention.

Referring to FIGS. 5A to 5F, the optical member 500 further includes refractive members 540a to 540f provided below an internal light reflection member 522. The refractive members 540a to 540f refract internal light incident into the refractive members 540a to 540f such that the internal light is directed to the internal light reflection member 522. Accordingly, when the refractive members 540a to 540f are employed, the amount of the internal light reaching the internal light reflection member 522 may be increased.

In FIGS. 5A to 5F, although the cross section of the internal light reflection member 522 has a rectangular shape, the shape of the internal light reflection member 522 may have various shapes according to embodiments.

The refractive members 540a to 540f may have various shapes to increase refractive efficiency. For example, the refractive members 540a to 540f may have at least one of a prism shape, a pyramid shape, and a concave-convex shape.

Figure 5A:
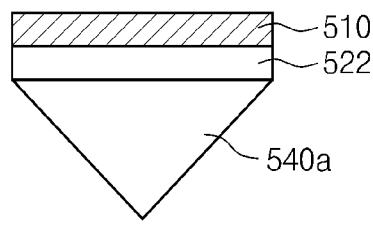
FIGS. 5A to 5F are views showing an optical member of FIG. 1A or 1B according to an embodiment of the present invention.
Figure 5B:
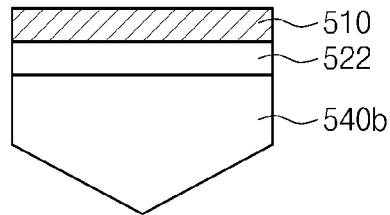
Figure 5C:
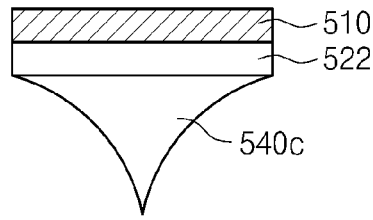
Figure 5D:
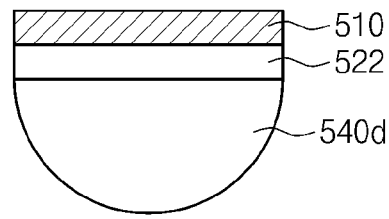
Figure 5E:
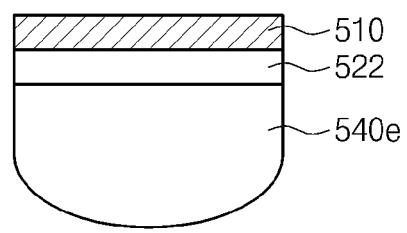
Figure 5F:
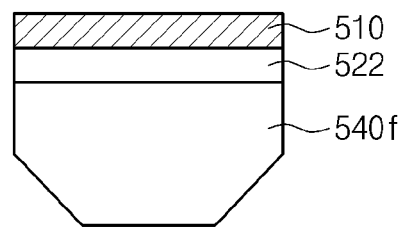

In FIG. 5A, the refractive member 540a has a triangular cross-section, and in FIG. 5B, the refractive member 540b has a pentagonal cross-section. In FIG. 5C, the cross-section of the refractive member 540c has the shape of a triangle with two concaved sides. In FIG. 5D, the cross-section of the refractive member 540d has a semi-circular shape. In FIG. 5E, the cross-section of the refractive member 540e has the shape of a rectangle having one oval surface. In FIG. 5F, the cross-section of the refractive member 540f has a hexagonal shape.

In FIGS. 5A to 5F, the cross-sectional shapes of the refractive members 540a to 540f are provided as illustrative purposes, but the present invention is not limited thereto.

The external light anti-reflection member 510, the internal light reflection members 520a to 520f, the support members 530a to 530f, and the refractive members 540a to 540f shown in FIGS. 3A to 5F may have different sizes according to embodiments.

Figure 6A:
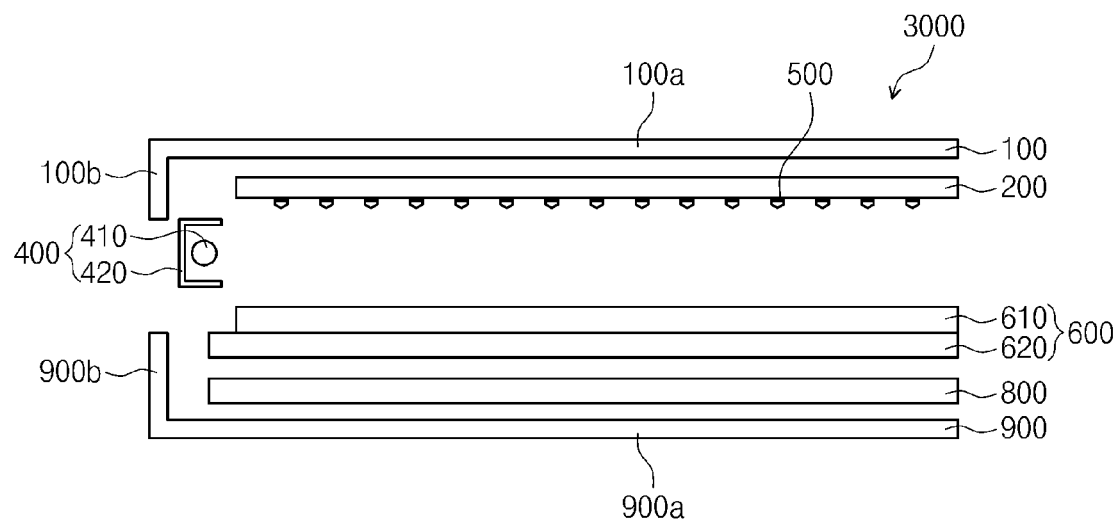
FIG. 6A is a sectional view showing a liquid crystal display according to an embodiment of the present invention.
Figure 6B:
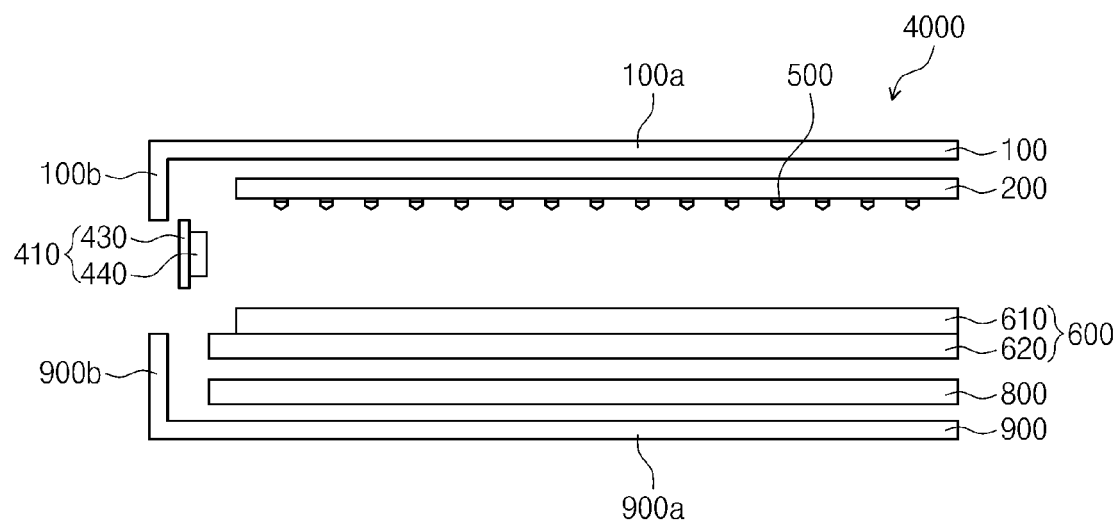
FIG. 6B is a sectional view showing a liquid crystal display including a modified light source according to an embodiment of the present invention.

FIG. 6A is a sectional view showing an LCD 3000 according to an embodiment of the present invention, and FIG. 6B is a sectional view showing an LCD 4000 including a modified light source according to an embodiment of the present invention.

The same reference numerals will be assigned to the same or substantially the same elements as those of the LCD 1000 or 2000 described in connection with FIG. 1A, 1B, or 2.

Referring to FIGS. 6A and 6B, the LCD 3000 or LCD 4000 according to an embodiment of the present invention has a front-light unit at an upper portion and the liquid crystal display panel 600 at a lower portion.

The front-light unit includes the light source unit 400, the protective substrate 200, and the optical member 500 provided at a lower portion of the protective substrate 200.

Differently from the optical member 500 shown in FIGS. 1A to 1B, as shown in FIGS. 6A and 6B, the optical member 500 is directly provided on the lower portion of the protective substrate 200, so that external light incident from an external light source through the protective substrate 200 is prevented from being incident into the LCD 1000. The optical member 500 further includes the internal light reflection member 520 to reflect light, which is output to the outside from the internal light source 410, to the liquid crystal display panel 600. Accordingly, the arrangement of the elements is changed, but an optical path is similar to that described in connection with FIGS. 1A and 1B. In addition, the number of parts is reduced so that the manufacturing cost can be reduced. The other elements are the same or substantially the same as those described in connection with FIGS. 1A and 1B.

Although not shown, the LCD 1000 or LCD 2000 may further include a light guide plate between the protective substrate 200 and the liquid crystal display panel 600 to guide internal light emitted from the internal light source 410 to the light guide display panel 600.

Figure 7:
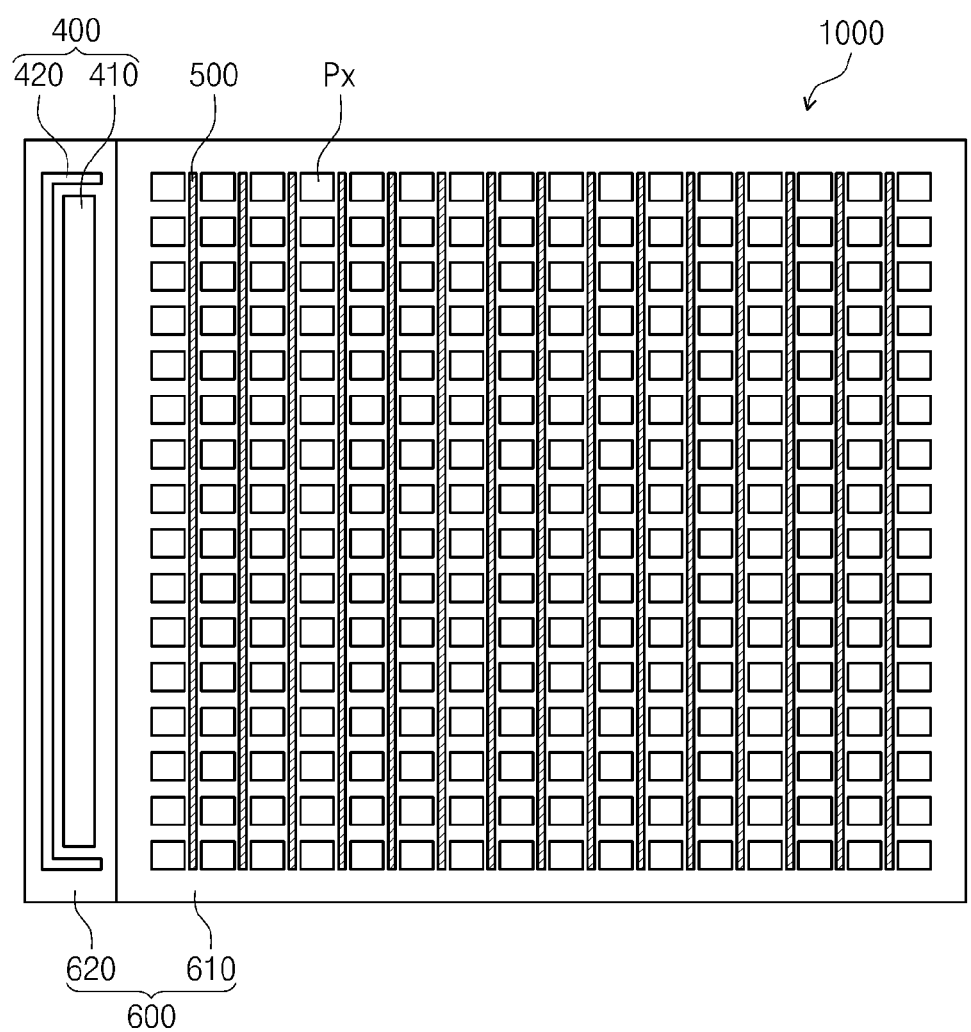
FIG. 7 is a plan view showing the liquid crystal display of FIG. 1A according to an embodiment of the present invention.

FIG. 7 is a plan view showing the LCD 1000 of FIG. 1A according to an embodiment of the present invention.

Referring to FIG. 7, the LCD 1000 includes the color filter substrate 610, the TFT substrate 620, and the light source unit 400. The light source unit 400 includes the internal light source 410 and the light source cover 420. The TFT substrate 620 includes a plurality of pixel regions Px, and the optical member 500 is positioned below the light guide plate (not shown).

As shown in FIG. 7, the optical member 500 is interposed between two adjacent pixel regions. Although the optical member 500 is interposed between two adjacent pixel regions parallel to the internal light source 410, the optical member 500 may be interposed between two adjacent pixel regions perpendicular to the internal light source 410.

Figure 8:
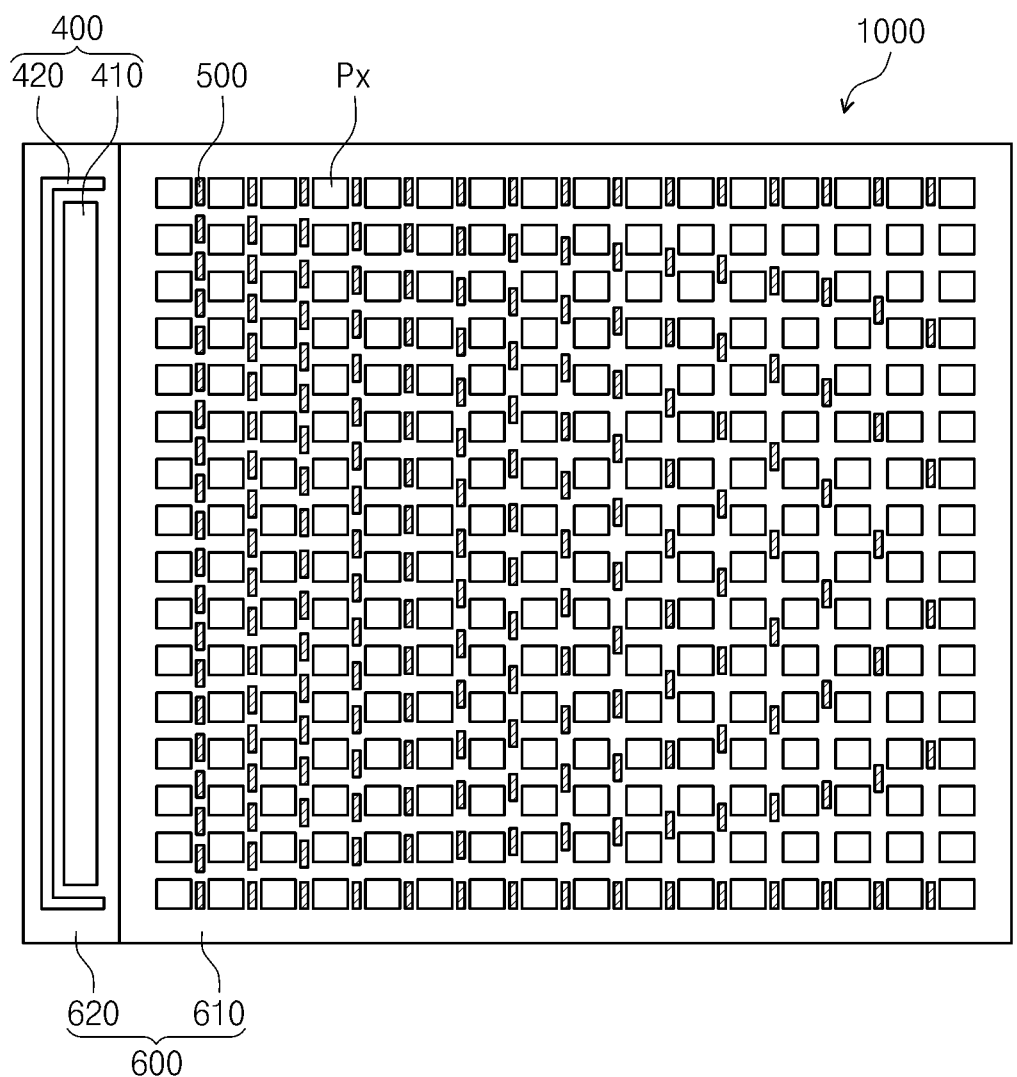
FIG. 8 is a plan view showing the liquid crystal display of FIG. 1A according to an embodiment of the present invention.

FIG. 8 is a plan view showing the LCD 1000 of FIG. 1A according to an embodiment of the present invention.

Referring to FIG. 8, the LCD 1000 includes the color filter substrate 610, the TFT substrate 620, and the light source unit 400. The light source unit 400 includes the internal light source 410 and the light source cover 420. The TFT substrate 620 includes a plurality of pixel regions Px, and the optical member 500 is positioned below the light guide plate (not shown).

In FIG. 8, a plurality of optical members 500 are provided. In addition, as the optical members 500 are away from the internal light source 410, the number of the optical members 500 per unit area is reduced. The amount of internal light, which is directly output to the protective substrate 200 is greater at a region adjacent to the internal light source 410 than at a region far from the internal light source 410. Due to the above structure, the internal light, which is directly output from the region adjacent to the internal light source 410 to the protective substrate 200, can be reflected toward the liquid crystal display panel 600. When the number or arrangement of the light sources provided in the LCD 1000 is changed according to embodiments, the arrangement of the optical members 500 may be changed.

Although the optical members 500 are interposed between two adjacent pixel regions parallel to the internal light source 410 in FIG. 8, the optical members 500 may be interposed between two adjacent pixel regions perpendicular to the internal light source 410.

Although FIGS. 7 and 8 are described in relation to FIG. 1A, the embodiments described in connection with FIGS. 7 and 8 can be also applied to the display apparatus of FIGS. 1B, 6A, and 6B. Similarly to FIGS. 1A and 1B, the optical members shown in FIGS. 6A, 6B, 7, and 8 may have various shapes shown in FIGS. 3A to 5F or various shapes easily derived from the shapes.

According to the embodiments of the present invention, external light emitted from an external light source can be prevented from being excessively incident into the display apparatus, thereby improving visibility. Internal light emitted from an internal light source to an outside is reflected to the liquid crystal display panel to increase light efficiency.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   a display panel; and
   a front-light unit comprising,
      an internal light source,
      a light guide plate positioned to guide internal light emitted from the internal light source to the display panel, and
      an optical member provided at an upper portion of the light guide plate, wherein the optical member includes a stacked structure of an internal light reflection member and an external light anti-reflection member on the internal light reflection member, wherein the external light anti-reflecting member of the optical member is separated from an external light anti-reflecting member of a second optical member that is positioned adjacent to the optical member, wherein the display panel includes two adjacent pixel regions, and the optical member is positioned between the two adjacent pixel regions.

2. The display apparatus of claim 1, wherein the external light anti-reflection member is positioned to prevent the external light from being incident into the display panel, and the internal light reflection member is positioned to reflect the internal light to the display panel, wherein the internal light exits from the display apparatus in an opposite direction from the display panel.

3. The display apparatus of claim 2, further comprising a protective substrate provided at an upper portion of the front-light unit.

4. The display apparatus of claim 3, further comprising:
   a lower container receiving the protective substrate, the front-light unit, and the display panel; and
   an upper container coupled with the lower container and securing the protective substrate, the front-light unit, and the display panel.

5. The display apparatus of claim 4, wherein the internal light source comprises at least one of a cold cathode fluorescent lamp, a hot cathode fluorescent lamp, an external electrode fluorescent lamp, and a light emitting diode.

6. The display apparatus of claim 5, wherein the display panel is a liquid crystal display panel.

7. The display apparatus of claim 2, wherein the internal light reflection member comprises a first member contacting the external light anti-reflection member and a second member provided on the first member and reflecting the internal light to the display panel.

8. The display apparatus of claim 7, wherein the second member has at least one of a prism shape, a pyramid shape, and a concave-convex shape.

9. The display apparatus of claim 1, wherein a groove recessed toward a bottom surface of the light guide plate is provided on a top surface of the light guide plate, and the optical member is provided corresponding to the groove.

10. The display apparatus of claim 1, wherein a plurality of optical members are provided, and the number of the optical members per unit area is decreased as a distance between the optical members and the internal light source increases.

11. A display apparatus comprising:
    a display panel;
    an internal light source; and
    an optical member positioned on a substrate, wherein the optical member includes a stacked structure of an internal light reflection member and an external light anti-reflection member on the internal light reflection member, wherein the external light anti-reflecting member of the optical member is separated from an external light anti-reflecting member of a second optical member that is positioned adjacent to the optical member, wherein the display panel includes two adjacent pixel regions, and the optical member is positioned between the two adjacent pixel regions.

12. The display apparatus of claim 11, wherein the external light anti-reflection member is positioned to prevent external light from being incident into the display panel, and the internal light reflection member is positioned to reflect internal light to the display panel, wherein the internal light exits from the display apparatus in an opposite direction from the display panel, to the display panel.

13. The display apparatus of claim 12, wherein the substrate comprises a protective substrate.

14. The display apparatus of claim 13, further comprising:
    a lower container receiving the protective substrate, the internal light source, and the display panel; and
    an upper container coupled with the lower container and securing the protective substrate, the internal light source, and the display panel.

15. The display apparatus of claim 14, wherein the internal light source comprises at least one of a cold cathode fluorescent lamp, a hot cathode fluorescent lamp, an external electrode fluorescent lamp, and a light emitting diode.

16. The display apparatus of claim 15, wherein the display panel is a liquid crystal display panel.

17. The display apparatus of claim 16, further comprising a light guide plate positioned to guide the internal light emitted from the internal light source to the display panel.

18. The display apparatus of claim 12, wherein the internal light reflection member comprises a first member contacting the external light anti-reflection member and a second member provided on the first member positioned to reflect the internal light to the display panel.

19. The display apparatus of claim 18, wherein the second member has at least one of a prism shape, a pyramid shape, and a concave-convex shape.

20. The display apparatus of claim 11, wherein a plurality of optical members are provided, and the number of the optical members per unit area is decreased as a distance between the optical members and the internal light source increases.

* * * * *